Aug. 3, 1954   A. E. PORTER   2,685,215
SAW FILING APPARATUS
Filed Dec. 15, 1952   3 Sheets-Sheet 1
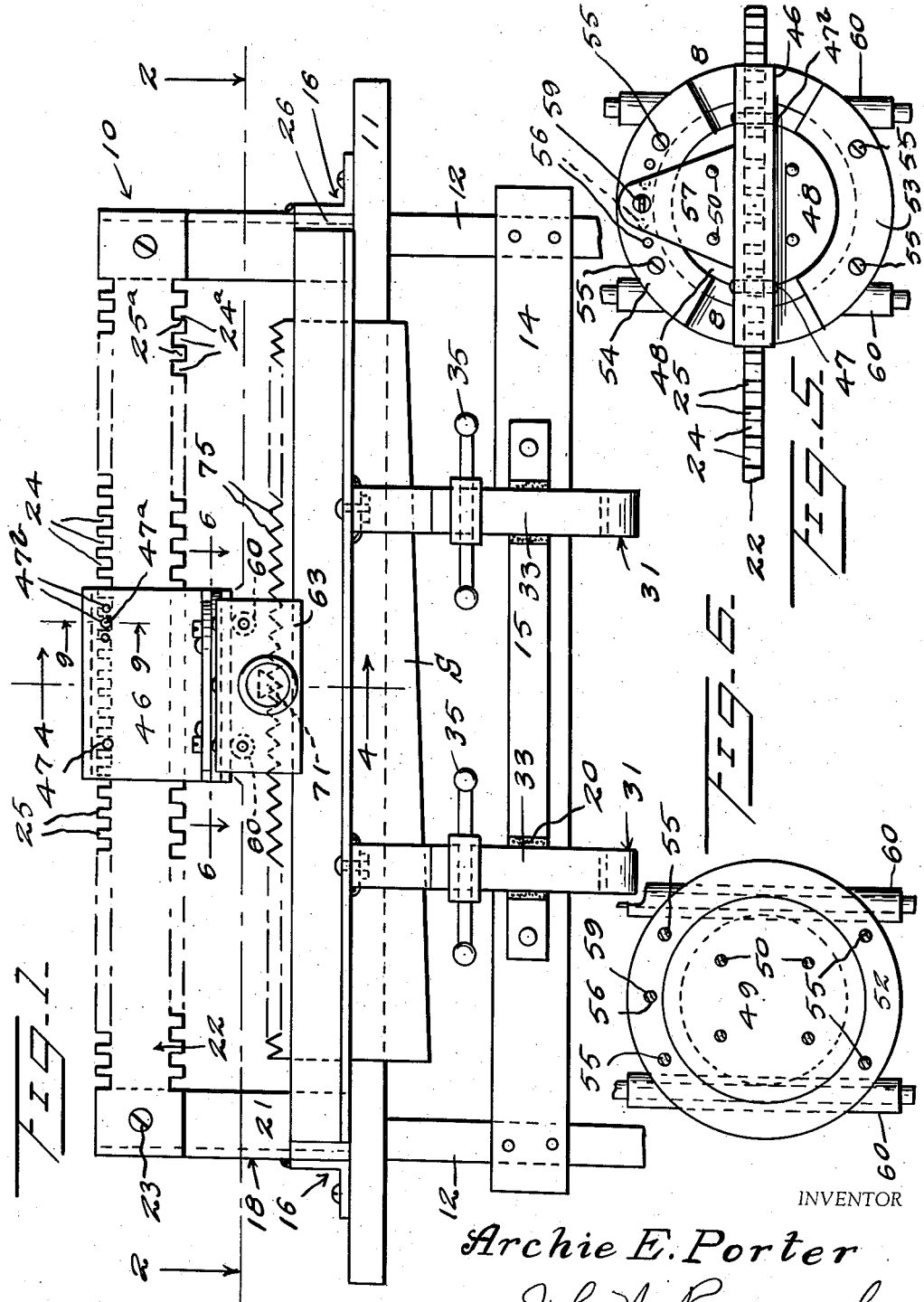
INVENTOR
Archie E. Porter
BY John N. Randolph
ATTORNEY

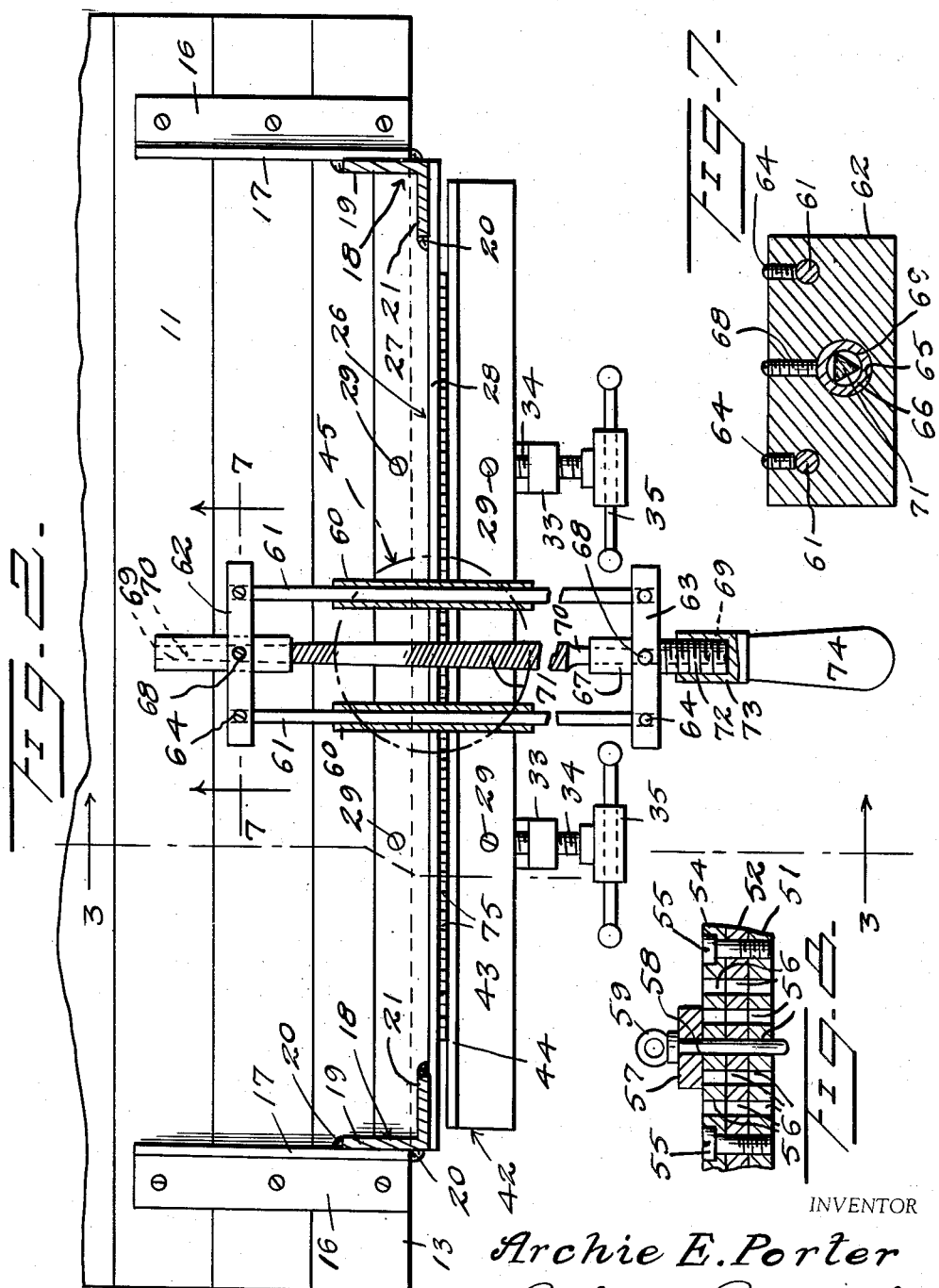

Aug. 3, 1954 A. E. PORTER 2,685,215
SAW FILING APPARATUS
Filed Dec. 15, 1952 3 Sheets-Sheet 3
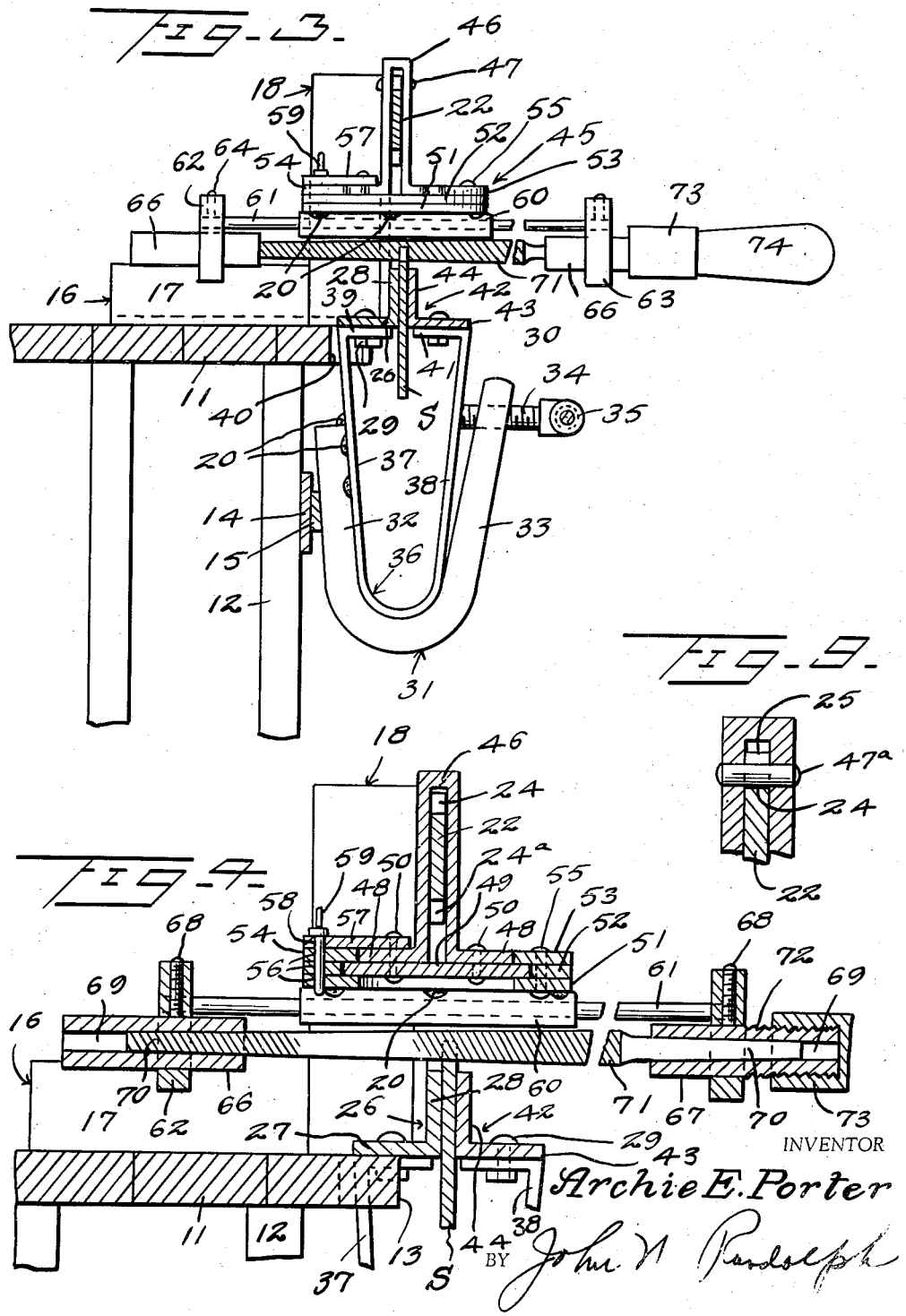
INVENTOR
Archie E. Porter
BY John N. Randolph Patented Aug. 3, 1954

2,685,215

UNITED STATES PATENT OFFICE 2,685,215

SAW FILING APPARATUS

Archie E. Porter, Washougal, Wash.

Application December 15, 1952, Serial No. 325,936

2 Claims. (Cl. 76—31)

This invention relates to a novel apparatus of extremely simple construction for efficiently and accurately filing saw blades for sharpening and bevelling the saw teeth, for jointing and re-spacing the saw teeth and if necessary for re-toothing the saw blades.

Another object of the invention is to provide a saw filer which after being initially set will accurately file all of the teeth of a saw to a corresponding depth and bevel and which may be readily adjusted for varying the bevel at which the teeth of a saw are filed and for filing saws having teeth spaced different distances apart with accuracy and uniformity.

Another object of the invention is to provide a saw filer by the use of which saw teeth may be filed very rapidly due to the fact that the file may be quickly moved from tooth to tooth without risk of the file blade striking or damaging the saw teeth during this movement.

Another object of this invention is to provide a saw filer having a novel saw blade clamping structure enabling the saw blade to be initially clamped loosely therein for a fine adjustment of the saw blade relatively to the saw file prior to tightening and clamping the saw blade for the filing of the teeth thereof, and to thus insure an accurate and uniform filing of all of the saw teeth.

Various other objects and advantages of the invention will hereinafter become more fully apparent from the following description of the drawings, illustrating a presently preferred embodiment thereof, and wherein:

Figure 1 is a front elevational view of the saw filing apparatus;

Figure 2 is a fragmentary horizontal sectional view thereof taken substantially along a plane as indicated by the line 2—2 of Figure 1;

Figure 3 is a fragmentary cross sectional view taken substantially along a plane as indicated by the line 3—3 of Figure 2;

Figure 4 is an enlarged fragmentary cross sectional view taken substantially along a plane as indicated by the line 4—4 of Figure 1;

Figure 5 is a fragmentary plan view of a portion of the saw filer;

Figure 6 is a horizontal sectional view taken substantially along a plane as indicated by the line 6—6 of Figure 1;

Figure 7 is an enlarged vertical sectional view taken substantially along a plane as indicated by the line 7—7 of Figure 2;

Figure 8 is a vertical sectional view taken substantially along a plane as indicated by the line 8—8 of Figure 5, and Figure 9 is an enlarged fragmentary vertical sectional view taken substantially along a plane as indicated by the line 9—9 of Figure 1.

Referring more specifically to the drawings, the saw filing apparatus in its entirety is designated generally 10 and is adapted to be mounted on a workbench or table, as illustrated in the drawings, wherein a portion of a workbench or table is shown including a portion of a bench top 11 and portions of depending front legs 12 which extend downwardly from the underside of the bench top 11 adjacent a front edge 13 thereof. A supporting bar 14 extends between and is secured adjacent its ends to the front sides of the legs 12 and has a metal mounting strip 15 disposed longitudinally thereof and secured to its front side. The parts 14 and 15 constitute elements of the saw filer 10.

As best illustrated in Figures 1 and 2, a pair of angle members 16 are secured to the upper side of the bench top 11 transversely thereof, and project to adjacent the forward edge 13 of the bench top. Each of the angle members 16 has an upstanding wall 17, formed by one side thereof and disposed at its inner edge. A pair of upright posts 18, formed of angle iron, extend upwardly from the front edge of the table top 11 and are secured to the angle members 16. Each post 18 has a side 19 the lower portion of which is disposed against and secured to the upstanding side 17 of the adjacent angle member 16, as by welding, as indicated at 20. The other sides 21 of the posts 18 are spaced outwardly from the front edge 13 of the table top and disposed substantially parallel thereto. A locater bar 22 is supported by the upper ends of the posts 18 and on the outer side of the flanges 21 thereof and is detachably secured thereto by fastenings 23. The upper edge of the locator bar 22 is provided with spaced notches 24 which are uniformly spaced relatively thereto and separated by tooth-like elements 25. Similarly, the lower edge of the locator bar 22 is provided with notches 24a formed by spaced tooth-like elements 25a the width of which differs from the width of the tooth-like elements 25 so that the spacing between the notches 24a differs from the spacing between the notches 24. Thus, as will hereinafter become apparent, the upper edge of the bar containing the notches 24 may be utilized when the apparatus 10 is employed for sharpening a saw having a set of teeth spaced a certain distance apart, as for example, a seven point saw, whereas by securing the bar 22 on the posts 18 with the other edge in an uppermost position, the notches 24a may be used for sharpening a saw the teeth of which are differently spaced, as for example, a nine point saw. Similarly, other locator bars 22 having other spaces between the notches thereof may be interchangeably employed with the apparatus 10.

A stationary vise jaw 26 formed of angle iron has a horizontal side or flange 27 disposed on the bench top 11 and an upstanding outer flange forming a stationary jaw element 28 which is spaced outwardly from the front edge 13 of the bench top. The stationary jaw 26 is secured in any suitable manner at its ends to the lower ends of the posts 18. The stationary blade clamping jaw 26 constitutes a part of a saw blade clamp, designated generally 30, which additionally includes two or more substantially U-shaped members 31, as best illustrated in Figure 3, having inner and outer legs 32 and 33, respectively, which extend upwardly in diverging relationship, from an intermediate or bight portion thereof. The inner legs 32 of the members 31 are secured in any suitable manner as by welding, as indicated at 20, to the strips 15, and the longer outer legs 33 adjacent the upper ends thereof, each have a setscrew 34 extending threadedly therethrough and inwardly thereof and which setscrews are provided at their outer ends with relatively large turning handles 35. Each of the members 31 has a substantially U-shaped member 36 disposed therein including an inner leg 37 and an outer leg 38. The inner leg 37 is secured as by welding, as indicated at 20 to the leg 32 and extends upwardly therefrom and preferably terminates in an outturned upper portion 39 which is disposed against and secured to the underside of the stationary jaw portion by fastenings 29. As seen in Figure 3, the upper parts of the legs 37 are disposed in notches 40 in the front edge 13 of the bench top. The upper end of the outer leg 38 also extends upwardly to above the upper end of the outer leg 33 and said outer leg 38 is provided at its upper end with an inturned part 41. A movable jaw member 42, formed of angle iron, has a horizontal portion 43 which rests on the leg portion 41 of each of the U-shaped members 36 and is secured thereto by fastenings 29. The movable jaw 42 has an upstanding jaw portion 44 at its inner edge which is disposed in opposed relationship to the stationary jaw portion 28, and said jaw portions 28 and 44 are disposed between the adjacent ends of the inturned upper portions 39 and 41 of the legs 37 and 38. The screws 34 are adapted to be turned by the handles 35 for displacing said screws inwardly of the U-shaped members 31. The inner ends of the screws 34 bear against the outer legs 38 for displacing said legs 38 away from the legs 33 when the screws 34 are advanced inwardly to thereby displace the movable jaw 42 toward the stationary jaw 26. The U-shaped inner members 36 are formed of resilient material so that the outer legs 38 thereof may be swung inwardly and said legs are normally spring biased outwardly toward the outer legs 33 to displace the movable jaw 42 away from the stationary jaw 26.

A file supporting and guiding unit, designated generally 45, includes an elongated relatively narrow arch member 46 which fits slidably over the locator bar 22 and which is provided with a pair of transverse pins 47 and 47a which extend transversely therethrough, near the upper end of said arch member 46 and which simultaneously fit into locator bar notches 24 for supporting the unit 45 on the locator bar 22. The pin 47a is preferably removably mounted and may be selectively positioned in any one of a plurality of differently spaced openings 47b of the arch member 46, for a purpose that will hereinafter become apparent. As best seen in Figure 4, the arch member 46 is provided with outturned coplanar flanges 48 at its lower end which are secured to a disk 49 by fastenings 50. The disk 49 is disposed beneath the flanges 48 and is of a diameter greater than the distance between the remote ends of said flanges. A bottom ring member 51 having an inner diameter less than the diameter of the disk 49 and an outer diameter greater than the diameter of said disk is disposed concentrically beneath the disk. A spacing ring 52 of a thickness greater than that of the disk 49 is disposed loosely around said disk and is supported on the ring member 51. A pair of arcuate members 53 and 54 are disposed on the spacing ring 52, as best seen in Figures 4 and 5, and partially overlie portions of the disk 49 and are disposed concentrically around portions of the flanges 48. The parts 51, 52 and 53 are secured together by suitable fastenings 55 and the parts 51, 52 and 54 are similarly connected by other fastenings 55. A series of circumferentially spaced aligned openings 56 are formed in the parts 51, 52 and 54 or said openings 56 may be formed only in the member 54. A pointer-like member 57 is secured by the fastenings 50 to the upper side of the flange 48 which is located adjacent the member 54 and said pointer 57 has an outer portion overlying the arcuate member 54. The pointer 57 adjacent its outer end has an opening 58 which may be selectively aligned with any of the openings 56 for receiving a headed pin 59 to removably secure the parts 51, 52, 53, and 54 nonrotatably to the arch member 46 and the disk 49. A pair of parallel guide tubes 60 are secured as by welding, as indicated at 20 (Figure 2), to the underside of the bottom ring 51. A pair of rods 61 extend slidably through the guide tubes 60 and extend into or through crossheads 62 and 63, in which said rods 61 are adjustably secured by setscrews 64, carried by said crossheads. The crossheads 62 and 63 have correspondingly disposed bores 65 disposed between the rods 61 and below the level thereof. File end receiving sleeves or sockets 66 and 67 extend through and are adjustably mounted in the bores 65 of the crossheads 62 and 63, respectively. Said sleeves or sockets 66 and 67 are adjustably secured in the crossheads by setscrews 68, as best illustrated in Figure 7. The sleeves or sockets 66 and 67 have bores 69 which taper from their inner to their outer ends for receiving the tapered ends 70 of a saw file 71, the intermediate portion of which is ordinarily of triangular cross section, as best illustrated in Figure 7. The outer end of the sleeve or socket 67 is externally threaded, as seen at 72, in Figure 2, to be received in an internally threaded socket end 73 of a handle 74.

Assuming that the saw filing apparatus is fully assembled, as previously described and illustrated in Figure 1, and that the screws 34 are backed off for displacing the movable jaw away from the fixed jaw 26, a saw blade S may be inserted into the vise from either end thereof after which the screws 34 are advanced inwardly to displace the resilient legs 38 inwardly so that the saw blade S will be engaged and held loosely between the jaw portions 28 and 44. With the pins 47 and 47a engaging two of the notches 24, which notches are spaced apart a distance corresponding to the spaces between the teeth 75 of the saw S, the bottom or back edge of the saw is tapped to displace the toothed edge upwardly. The saw may be tapped at either end thereof until the file 71 is fully seated between two of the saw teeth and has its bottom edge engaging the bed of the notch between said teeth. This operation may be repeated, except for tapping the ends of the saw, with the file located adjacent each end of the saw. The arch member 46 may then be raised and displaced slightly in either direction to cause the pins 47 and 47a to rest on the upper ends of two teeth or lugs 25 of the locator bar 22. The pin 59 may then be removed from the openings 56 so that the rings 51 and 52 and the members 53 and 54 may be turned relatively to the arch member 46, disk 49 and pointer 57 to align other of the openings 56 with the pointer opening 58. The pin 59 is then applied to the aligned openings 56 and 58 for setting the file 71 at a desired angle to the saw blade S. The pins 47 and 47a are then positioned in certain of the notches 24 to locate the file 71 between two teeth at one end of the saw blade and the handle 74 is engaged for manually reciprocating the file back and forth across the tooth to be sharpened. The file 71 is supported and guided as it is reciprocated by the rods 61 which slidably engage the tubes 60, and the pins 47 and 47a by engagement with the locator bar notches 24 will support the file in a properly adjusted position while the tooth is filed thereby. After the first tooth has been filed, the arch member 46 is lifted upwardly and displaced to the right or left a distance corresponding to the spacing between two adjacent notches 24 and is then moved downwardly to engage the pins 47 and 47a in the next two notches and so that the sharpening operation may be successively repeated, as previously described, for each tooth of the saw. The notches 24 are of sufficient depth so that when the pins 47 and 47a are passing over the lugs 25 the file 71 is at a sufficient elevation so that it cannot contact the saw teeth and as the file can only be displaced downwardly when the pins are in alignment with the notches 24, and when the file 71 is correctly disposed to be received between two of the saw teeth 75, the possibility of damaging the saw teeth when moving the file is eliminated. After all of the teeth have been filed, as previously described, the saw is removed from the vise and turned around end for end and replaced therein and the same procedure is then followed for filing the opposite sides of the teeth.

The arch member 46 has a close fitting engagement with the opposite sides of the locator bar 22 to prevent any rocking movement for the file 71 and to insure uniformity in the extent that the teeth of the saw may be filed. Furthermore, the file is supported with its axis in substantially a horizontal plane and with the center of the file supporting unit disposed substantially directly above the saw. If desired, spacing elements or shims may be placed between the ends of the locator bar and the sides 21 of the posts 18 to exactly locate the center of the file supporting unit 45 above the saw blade S.

The saw teeth 75 are automatically jointed as they are filed and likewise automatically respaced. Where necessary the apparatus 10 may be utilized for re-cutting a new set of teeth in a saw blade after the original set has been filed off, by utilizing the apparatus in the same manner as previously described for sharpening, jointing and re-spacing the teeth.

Various modifications and changes are contemplated and may obviously be resorted to, without departing from the spirit or scope of the invention as hereinafter defined by the appended claims.

I claim as my invention:

1. In a saw filing apparatus having means for clamping a saw blade therein, a locator bar, means supporting the locator bar above the upwardly facing toothed edge of the saw blade and substantially parallel thereto, said bar having an upper edge provided with uniformly spaced upwardly opening notches, a file guiding unit including an arch shaped hanger member fitting nonrotatably over said locator bar and slidably mounted thereon, pins extending through said arch member and engaging said notches for supporting and locating the file guiding unit in an operative position on the locator bar, said file guiding unit including a rotatable bottom section turnably supported by the arch shaped member, parallel guide tubes secured to said rotatable bottom section, an elongated file supporting unit having means adapted to mount a file longitudinally thereof and including longitudinally extending substantially parallel rods extending reciprocally through said guide tubes and disposed above the level of the file, and means for securing said rotatable bottom section to the arch member in different angularly adjusted positions for positioning the file at different angles relatively to the plane of the saw blade, the height of said locator bar between the notches being greater than the depth of the saw teeth whereby the file will be disposed above the saw teeth when said arch shaped member is displaced upwardly sufficiently to disengage the pins thereof from the notches for adjusting the file guiding unit on the locator bar for successively positioning the file for successive engagement with the different teeth of the saw.

2. In a saw filing apparatus having means adapted to clamp a saw blade therein and for supporting the saw blade with the teeth thereof facing upwardly, a locator bar having a notched upper edge, means supporting the locator bar above and substantially parallel to the saw blade, a file guiding unit having an upper hanger portion slidably and nonrotatably suspended from said locator bar and a rotatable bottom section turnably connected to the hanger portion and disposed below the locator bar, said hanger portion having notch engaging elements selectively engaging in said notches for supporting the file guiding unit immovably on the locator bar, and a file supporting unit adapted to detachably support a file and reciprocably supported by said rotatable bottom section above the level of the file for reciprocably guiding the file in its movement back and forth across the saw teeth, means for angularly adjusting said bottom section relatively to the hanger section for positioning the axis of the file at different angles relatively to the plane of the saw blade, said hanger elements engaging the locator bar notches to support the file at a proper depth for filing the saw teeth and being movable to successively engage the different notches of the locator bar to successively position the file in engagement with the different teeth of the saw, the height of the bar between said notches being greater than the depth of the saw teeth whereby the file is disposed above the level of the saw teeth when the hanger elements are disengaged from the notches for moving the file guiding unit longitudinally of the locator bar.

References Cited in the file of this patent

UNITED STATES PATENTS

| Number | Name | Date |
|---|---|---|
| 425,332 | Lewis | Apr. 8, 1890 |
| 1,165,248 | Hanson | Dec. 21, 1915 |
| 1,223,191 | Merritt | Apr. 17, 1917 |
| 1,224,293 | Foley | May 1, 1917 |
| 1,544,183 | Robison | June 30, 1925 |
| 1,562,305 | Decheff | Nov. 17, 1925 |
| 1,785,613 | Blumer | Dec. 16, 1930 |
| 2,256,016 | Coghlan | Sept. 16, 1941 |